UNITED STATES PATENT OFFICE.

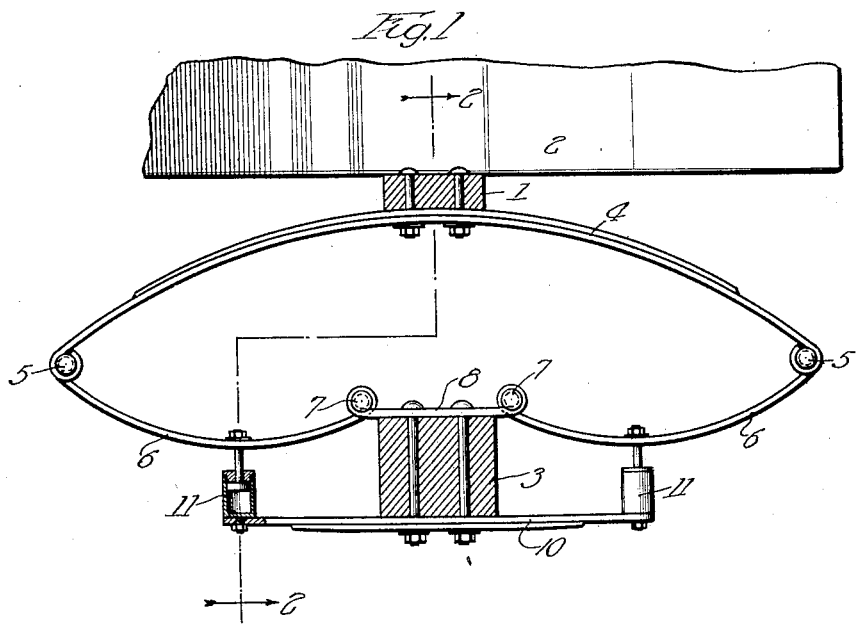
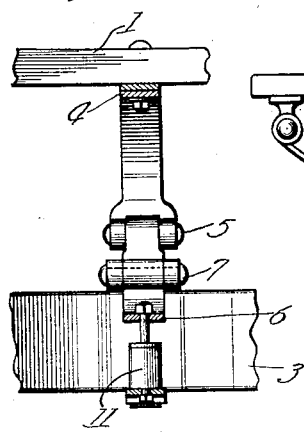
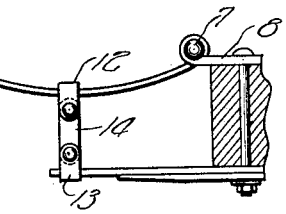

OSCAR PETERSON, OF MELROSE PARK, ILLINOIS.

VEHICLE-SPRING.

1,386,200.   Specification of Letters Patent.   Patented Aug. 2, 1921.

Application filed September 2, 1919. Serial No. 321,220.

*To all whom it may concern:*

Be it known that I, OSCAR PETERSON, a citizen of the United States, residing at the village of Melrose Park, in the county of Cook and State of Illinois, have invented certain new and useful Improvements in Vehicle-Springs, of which the following is a specification.

My invention relates to spring devices for road vehicles of all kinds. The object thereof is to provide a device which will have great strength for suporting weight, great capacity for absorbing shocks and a resiliency which will give easy carrying and riding qualities as well as freedom from breaking strains on the rebound. The principles of my invention are illustrated in the drawin which—

Figure 1 shows an elevation of my improved spring. Fig. 2 is a view on the line 2—2 of Fig. 1. Fig. 3 shows a modification thereof.

Further describing my invention with reference to the drawings in which like characters of reference denote like parts throughout, 1 is a cross-bar supporting a vehicle box 2. 3 represents a wagon axle in section. 4 is a semi-elliptic supporting spring secured centrally to the cross-bar 1. At the ends thereof by the pivotal attachment 5 said spring is connected to the comparatively short intermediate spring members 6 the inner ends of which are pivotally attached at 7 to a clip 8 secured to the axle 3. Another and foundation spring member 10 is centrally secured to the axle and on the outer ends thereof are placed supporting devices, the upper ends of which are secured to the spring members 6 at points between the ends thereof. Such supporting device may consist of shock absorbing mechanism 11 as illustrated in Figs. 1 and 2 in which a pneumatic device is presented or it may consist of clips 12 and 13 with a connecting link 14 as shown in Fig. 3.

It will be seen that shocks communicated to the device from the axle 3 will be distributed through a very extended spring system consisting of the members 4, 6, and 10, and in the case of the preferred device shown in Figs. 1 and 2, through the pneumatic element 11.

My invention is shown and described with reference to practical and operative forms thereof, but it may be embodied in other and variant forms which will be equally within the spirit and scope of my invention.

It will be further specially noted that the semi-elliptic spring 4 may be replaced by a rigid connecting bar 16 as further illustrated in Fig. 3, or the member 6 may be properly shackeled to cross bars under the vehicle body.

I claim:

1. In combination with a vehicle, a spring device having a downwardly turned semi-elliptic supporting member, a plurality of intermediate members having their outer ends pivotally connected to the ends of the supporting member and their inner ends pivotally connected to the vehicle axle, a foundation spring member rigidly attached to the vhicle axle below the last named members and resilient means for connecting the foundation and intermediate members.

2. In combination with a vehicle, a spring device having a downwardly turned semi-elliptic supporting member, a plurality of intermediate members having their outer ends pivotally connected to the ends of the supporting member and their inner ends pivotally connected to the vehicle axle, a foundation spring member rigidly attached to the vehicle axle below the last named members and resilient pneumatic means for connecting the foundation and intermediate members.

In witness whereof. I have hereunto set my hand at Chicago, Cook county, this 28th day of August, 1919.

OSCAR PETERSON.